United States Patent Office 3,526,091
Patented Sept. 1, 1970

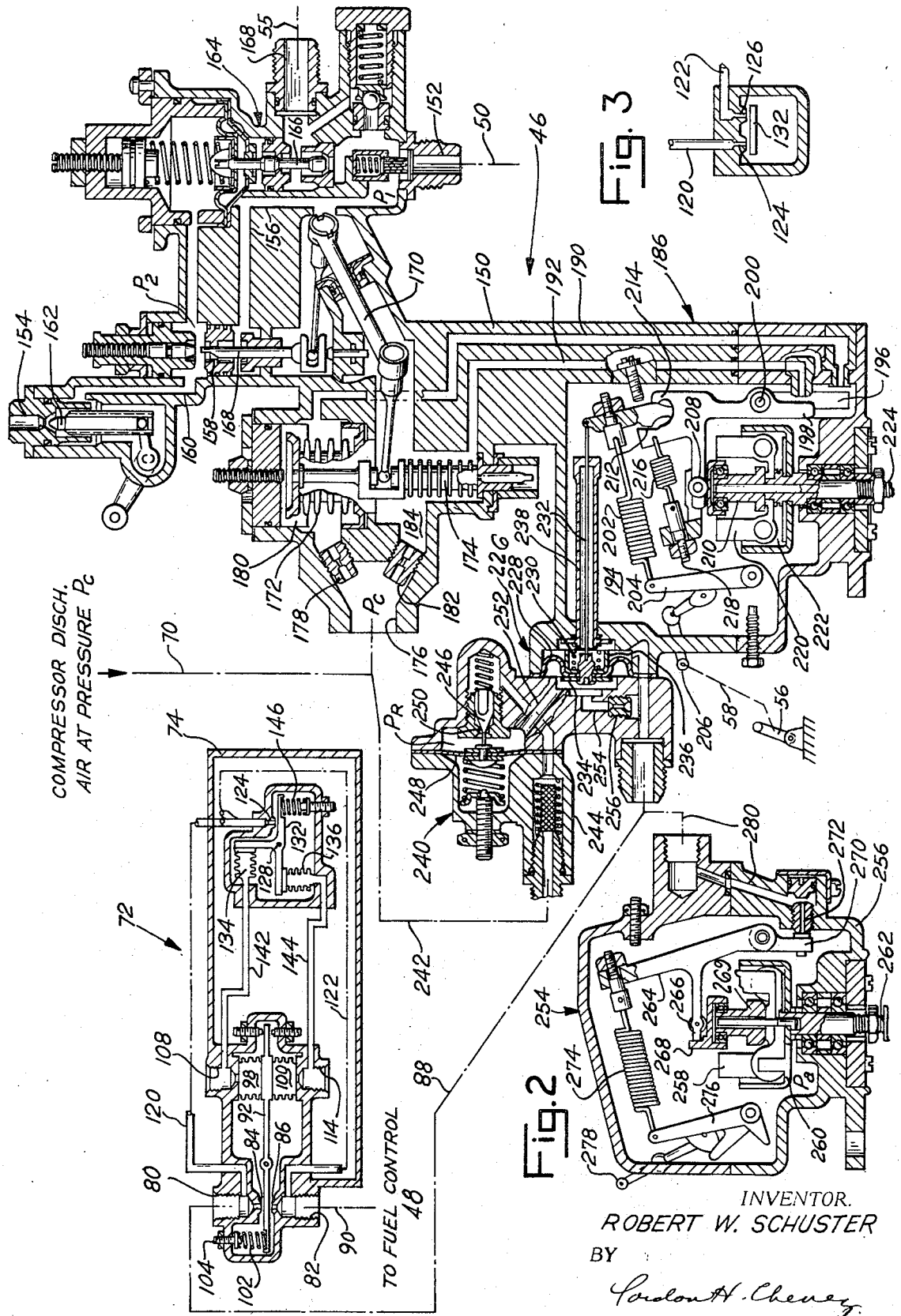

3,526,091
**CONTROL APPARATUS FOR EQUALIZING AND/
OR LIMITING AN ENGINE OPERATING CON-
DITION OF A PLURALITY OF GAS TURBINE
ENGINES**
Robert W. Schuster, South Bend, Ind., assignor to The
Bendix Corporation, a corporation of Delaware
Filed Nov. 15, 1968, Ser. No. 776,197
Int. Cl. F02b 73/00; F02c 9/08
U.S. Cl. 60—39.16    10 Claims

ABSTRACT OF THE DISCLOSURE

Control apparatus for equalizing the power of output of at least two gas turbine engines wherein each engine is controlled by separate fuel control systems both of which fuel control systems are connected to respond to engine torque sensing and comparing apparatus provided with oppositely acting bellows one of which responds to a fluid pressure representing output torque of one engine and the other of which responds to a fluid pressure representing output torque of the second engine and control means actuated by the two bellows for increasing fuel flow to one of the two engines to increase the output torque thereof in the event of output torque error therebetween. A pair of mutually assisting bellows each of which responds to one of the two fluid pressures representing torque output of the two engines and control means actuated by the mutually assisting bellows operates to limit the combined torque output of the two engines to a predetermined value and to increase fuel flow to one or both of the two engines irrespective of a torque error therebetween to maintain the predetermined combined torque output.

BACKGROUND OF THE INVENTION

The present invention relates to fuel control apparatus for gas turbine engines including apparatus for sensing and comparing an operating condition such as torque output for each engine and for limiting the combined torque output to a predetermined value in a multiple engine installation and modifying fuel flow to one or more of the engines to thereby qualize the sensed operation conditions of the engine as well as limit the total torque output thereof.

SUMMARY OF THE INVENTION

In certain multiple engine installations as, for example, a twin engine aircraft, it is desirable to maintain power output of the engines substantially equal particularly when large total power output of the engines is demanded. Those persons skilled in the art will recognize that an unbalance of power output between the two engines may result in an out-of-trim condition of the aircraft which, in turn, reduces the aerodynamic efficiency of the aircraft and increase the work of the pilot in controlling the attitude of the aircraft. In addition, in the event of the multiple engines operating at a predetermined limit of the combined power output of the multiple engines, it is desirable that the power output of one engine be adjusted to maintain the combined power output at the predetermined limit irrespective of a power output error therebetween. Furthermore, some multiple engine installations require a common gear box through which the output torque from all of the engines is transmitted in which case torque equalization is desirable to prevent a low torque engine from absorbing power from a higher torque output engine.

It is therefore an object of the present invention to provide apparatus for sensing and comparing conditions indicative of the power output of each of two combustion engines, at least, and providing a power output error signal which is imposed on fuel flow to one of the two engines to thereby modify the power output thereof to substantially equal the power output of the other engine.

It is another object of the present invention to provide fuel flow control apparatus for sensing the total combined power output of two combustion engines, at least, and controlling fuel flow to maintain the total combined power output at a predetermined maximum allowable value irrespective of a power output error between the engines.

It is another object of the present invention to provide fuel flow control apparatus for sensing and comparing engine operation conditions indicative of the power output of each of two combustion engines, at least, and controlling fuel flow to maintain the combined power output of the two engines at a predetermined maximum limit as well as control fuel flow to one engine independently of the other such that both engines contribute substantially equally in the predetermined maximum combined power output.

It is an important object of the present invention to provide fuel flow control apparatus for sensing and comparing engine operating conditions indicative of the power output of each of two combustion engines, at least, and controlling fuel flow to the engines to equalize the power output of the engines as well as establish a predetermined limit on the combined power output thereof under engine steady state operating conditions.

It is an important object of the present invention to provide fuel flow control apparatus for sensing the power output of each of two combustion engines and controlling fuel flow to increase the power output of one engine so as to partially, at least, compensate for failure of the other engine.

BRIEF DESCRIPTION OF THE DRAWINGS

FIG. 2 is a schematic sectional view of one of the two identical fuel controls associated with the two engines of FIG. 1.

FIG. 3 is a sectional view taken on line 3—3 of FIG. 1.

DESCRIPTION OF THE PREFERRED EMBODIMENT

Figure 1:
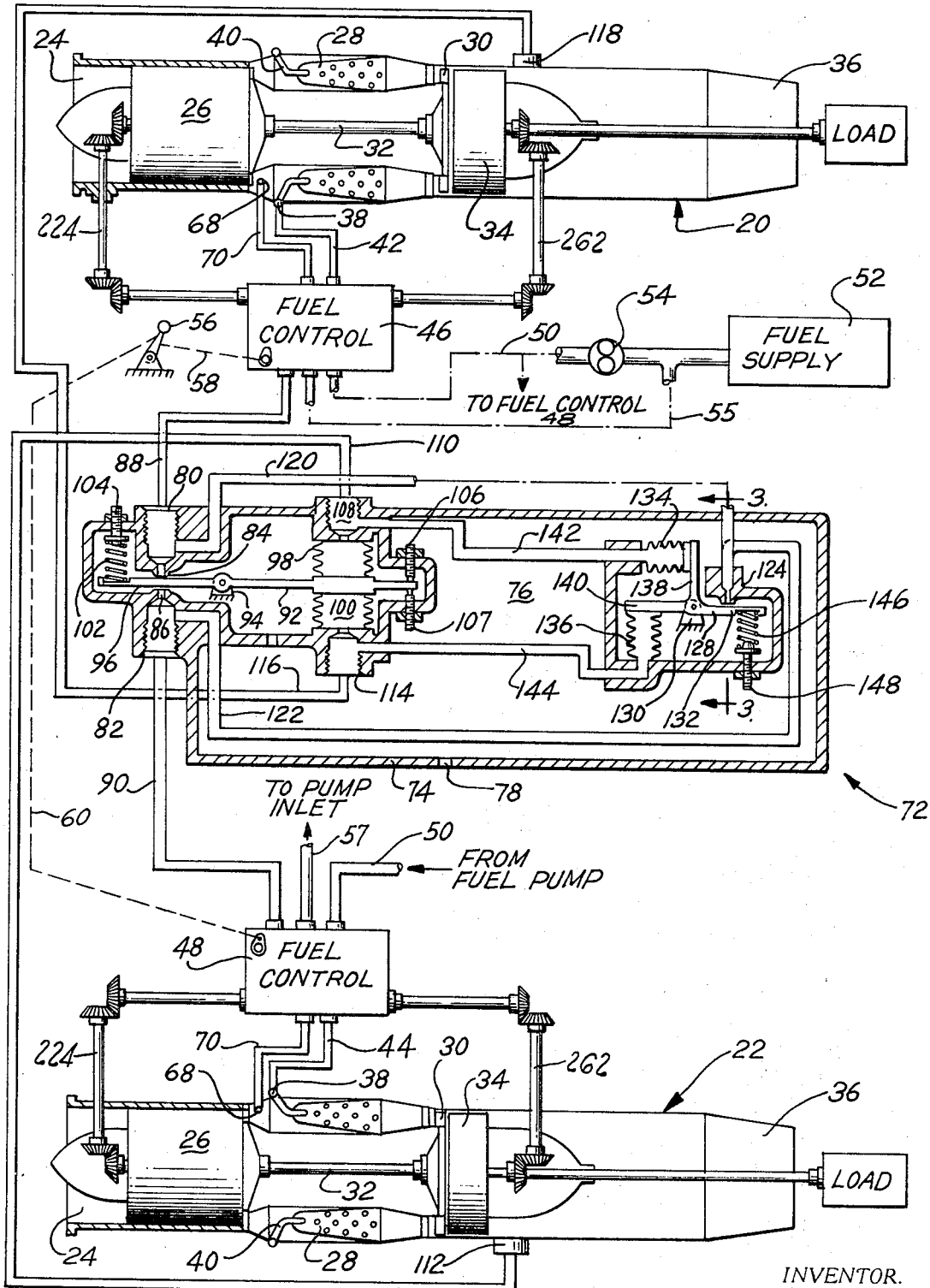
FIG. 1 is a schematic representation of two gas turbine engines and fuel control system therefor embodying the present invention.

Referring to the drawings and, in particular, FIG. 1, numerals 20 and 22 designate two gas turbine engines each having an air inlet 24 leading to an air compressor 26 which discharges air at relatively high pressure $P_c$ to a plurality of combustion chambers 28. Hot motive gas generated in the combustion chambers 28 as a result of the combustion process therein passes therefrom through a rotatably mounted gas producer gas turbine 30 connected to drive compressor 26 via a shaft 32 and then through a free or power gas turbine 34 rotatably mounted independently of compressor 26 and adapted to provide a source of power for external use. The gas may exhaust from turbine 34 through exhaust nozzle 36 to the atmosphere.

A fuel manifold 38 supplies pressurized fuel to fuel nozzles 40 which, in turn, are connected to inject fuel into combustion chambers 28 where the resulting air and fuel mixture is ignited and burned to generate hot motive gas. A pressurized flow of metered fuel is supplied to each manifold 38 via associated conduits 42 and 44 leading from fuel control units 46 and 48, respectively. The fuel control units 46 and 48 are supplied unmetered pressurized fuel via bifurcated conduit 50 leading from a fuel tank 52 and provided with one or more engine driven fuel pumps 54 for pressurizing fuel flow therethrough. Fuel by-pass conduits 55 and 57 connect fuel control units 46 and 48, respectively, with conduit 50 at the inlet side of pump 54.

A movable engine speed or power selection lever 56 is connected via links 58 and 60 to fuel control units 46 and 48, respectively, thereby providing a corresponding input signal to operate each fuel control 46 and 48.

Compressor discharge air at pressure $P_c$ from each of the engines is transmitted via an associated pressure pickup 68 and conduit 70 to associated fuel control units 46 and 48.

The fuel control units 46 and 48 are identical and preferably of the pneumatic type shown and described in detail in copending application Ser. No. 754,081, filed Aug. 20 1968, in the name of Robert G. Moore, Jr. (common assignee). FIG. 2 is a sectional schematic of one of the two identical fuel controls 46 and 48 which, per se, are described only to the extent necessary to indicate the control function impressed thereon by the present invention. Reference is made to said application Ser. No. 754,081 for details of the fuel control 46 or 48 if desired.

The present invention generally indicated by 72 includes a casing 74 which defines a chamber 76 vented to a relatively low fluid pressure drain source $P_a$ such as the atmosphere via a port 78. Ports 80 and 82 are provided with discharge orifices 84 and 86, respectively which are aligned in relatively closely spaced apart relationship and communicate with chamber 76. A passage 88 connects port 80 with fuel control 46 and communicates interiorly thereof with a control fluid pressure as will be described. Likewise, a passage 90 connects port 82 with fuel control 48 and communicates with a control fluid pressure therein.

A lever 92 suitably pinned to a fixed support 94 for pivotal movement therein is provided with a valve flapper portion 96 which extends between discharge orifices 84 and 86 and moves relative thereto to modify the effective flow areas thereof in reverse relative relationship depending upon the position of the lever 92. The position of the lever 92 is determined by opposing axially aligned bellows 98 and 100 having fixed ends anchored to casing 74 by any suitable means providing a fluid seal and movable ends secured to lever 92. A preload is imposed on lever 92 by a compression spring 102 interposed between one end of lever 92 and an adjustable spring retainer 104 threadedly engaged with casing 74. The opposite end of lever 92 is adapted to engage spaced apart adjustable stops 106 and 107 threadedly engaged with casing 74 which limit the extent of movement of lever 92.

The interior of bellows 98 is vented via a port 108 and passage 110 to a conventional torque sensing device 112 suitably connected to engine 22 and adapted to respond to a variable condition of power turbine 34 representative of output torque thereof and capable of producing a corresponding variable output fluid pressure signal to passage 110. The interior of bellows 100 is vented via a port 114 and passage 116 to a second torque sensing device 118 equivalent to torque sensing device 112 and connected to respond to a variable condition of power turbine 34 of engine 20 representative of output torque thereof. The torque sensing device 118, like torque sensing device 112, is capable of providing a variable output fluid pressure signal which varies in accordance with the torque output of associated turbine 34.

The ports 80 and 82 are further vented via passages 120 and 122 connected in parallel flow relationship with discharge orifices 84 and 86, respectively, to chamber 76 at pressure $P_a$. Orifices 124 and 126 connected to the discharge end of passages 120 and 122, respectively are arranged in relatively closely spaced apart relationship (see FIG. 3). A lever 128 suitably pinned to a fixed support 130 for pivotal movement thereon is provided with a plurality of arms one of which defines a valve flapper 132 adapted to move toward or away from orifices 124 and 126 to vary the effective flow area thereof simultaneously in response to movement of lever 128. A pair of bellows 134 and 136 are anchored at one end to casing 76 by any suitable means providing a fluid seal. The opposite movable closed ends of bellows 134 and 136 are suitably secured to arms 138 and 140, respectively, of lever 128. The bellows 134 and 136 are vented interiorly to ports 108 and 114 via passages 142 and 144, respectively. A pre-load is imposed against lever 128 tending to urge valve flapper 132 toward orifices 124 and 126 by a compression spring 146 interposed between lever 128 and an adjustable spring retainer 148 threadedly engaged with casing 76.

Referring to FIG. 2, one of the two identical fuel control units 46 and 48 is shown in greater detail to illustrate the manner in which the present invention cooperates therewith to modify the fuel metering function thereof. The fuel control 46 shown includes a casing 150 having an inlet 152 connected to fuel supply conduit 50 and an outlet 154 connected to conduit 42. Fuel passes from inlet 152 to outlet 154 via conduit means including passage 156, a variable area fuel metering orifice 158, passage 160 and fuel cut-off valve 162. A fuel bypass valve mechanism generally indicated by 164 is responsive to the fuel pressure differential across orifice 158 and includes a bypass valve 166 adapted to divert fuel at unmetered pressure $P_1$ from inlet 152 to a fuel by-pass outlet 168 connected to by-pass conduit 55 as necessary to maintain the pressure differential across metering orifice 158 at a constant predetermined value regardless of the effective flow area of orifice 158. A metering valve 168 is suitably connected to orifice 158 and movable relative thereto to vary the effective flow of the same such that, with a constant fuel pressure differential thereacross, metered fuel flow to the engine varies as a function of the flow area of orifice 158 only.

The valve 168 is connected via linkage mechanism generally indicated by 170 to a governor bellows 172 and a relatively smaller evacuated acceleration bellows 174 which respond to various fluid pressures derived from air at pressure $P_c$ discharged by compressor 26 of engine 22 which is transmitted via conduit 70 to an inlet port 176 in casing 150. From inlet port 176, compressor discharge air passes through a restriction 178 into a chamber 180 and through a restriction 182 to a chamber 184 separated from chamber 180 by bellows 172. The bellows 172 is responsive to the pressure differential between chambers 180 and 184 whereas the evacuated bellows 174 is responsive to the pressure in chamber 184 only.

Governor mechanism generally indicated by 186 is adapted to control the air pressure in chambers 180 and 184 to maintain the engine speed at a predetermined value depending upon the position of control lever 56. To that end, the chambers 180 and 184 are communicated via passages 190 and 192 respectively, to a chamber 194 which is vented to a relatively low pressure drain source such as the atmosphere at pressure $P_a$. The effective flow areas of passages 190 and 192 and thus the air pressures in chambers 180 and 184, respectively, are controlled by levers 196 and 198 suitably mounted on a fixed support 200 and adapted to function as valve flappers.

A tension spring 202 interposed between one end of lever 196 and a pivotally mounted lever 204 loads lever 196 with a variable force in a direction tending to close passage 190. The lever 204 is suitably connected to a control member 206 which is connected to link 58 to vary the spring 202 force on lever 196 as a function of the position of control member 56.

The lever 198 is provided with an arm which rotatably carries a roller 208 adapted to bear against a thrust member 210. The lever 196 is straddled by a pair of spaced apart abutments 212 and 214 formed on lever 198. A tension spring 216 interposed between lever 198 and a spring retainer 218 integral with lever 196 loads lever 198 in a direction opposing force applied to roller 208 by thrust member 210. A pair of centrifugal wegihts 220 suitably mounted on a rotatable support 222 are adapted to impose a force against thrust member 210 which varies as a function of the speed of rotation of support 222. The rotatable support is connected via suitable linkage means generally indicated by 224 to the compressor 26 of associated engine 20 or 22 to establish the output force of centrifugal weights 220 a function of the rotational speed of compressor 26.

Governor reset mechanism generally indicated by 226 includes a diaphragm 228 fixedly secured at its outermost portion to casing 150 and loaded by a compression spring 230 interposed between casing 150 and diaphragm 228. A rod or stem 232 fixedly secured to diaphragm 228 by any suitable means such as backing plates 234 and 236 is slidably carried in a fixed tubular housing 238 and adapted to extend therethrough into engagement with lever 196. Backing plates 234 and 236 also function as stops by engaging casing 150 to limit the range of movement of diaphragm 228.

An air pressure regulator generally indicated by 240 is connected to receive compressor discharge air at pressure $P_c$ via a passage 242 including a filter 244 and includes a spring loaded valve 246 having a diaphragm 248 secured thereto. The valve 246 controls a valve port 250 vented to a suitable air pressure drain source such as the atmosphere to regulate the air pressure downstream from port 250 to a predetermined constant pressure $P_r$. The predetermined constant pressure $P_r$ is determined by the spring force imposed against valve 246 and aided by the force generated by atmosphere air pressure $P_a$ acting against diaphragm 248 in opposition to the air pressure downstream from valve port 250. The air at constant pressure $P_r$ is transmitted from regulator 240 via a passage 252 to one side of reset diaphragm 228 and to the opposite side of diaphragm 228 via a branch passage 254 having a restriction 256 therein.

A power turbine governor generally indicated by 254 includes a casing 256 containing a pair of centrifugal weights 258 suitably connected to a rotatable support 260 which is driven by power turbine 34 through linkage means 262. A lever 264 pivotally mounted on a fixed support such as casing 256 carries a roller 266 rotatably secured thereto which roller 266 bears against one end of a thrust member 268 rotatably mounted on a second thrust member 269. The centrifugal weights are adapted to bear against the opposite end of thrust member 269 which is slidably carried on support 260. The lever 264 is provided with a valve flapper portion 270 which moves relative to an orifice 272 to vary the effective flow area thereof. The lever 264 is loaded by a tension spring 274 having one end secured to lever 264 and an opposite end secured to a lever 276 pivotally mounted on a fixed support such as casing 256. The lever 276 is suitably positioned by a control member 278 to vary the spring 274 force imposed on lever 264 as a function of the position of the control lever 278.

The orifice 272 is connected via a passage 280 to branch passage 254 downstream from restriction 256 in reset mechanism 226 and is adapted to vent compressor discharge air from passage 254 to the interior of casing 256 at relatively low atmosphere air pressure $P_a$. Passage 88 connects passage 280 with port 80 of casing 74 in the case of fuel control 46 and passage 90 connects passage 280 with port 82 of casing 74 in the case of fuel control 48.

OPERATION

In the following description of operation it will be understood that the preferred control procedure over the engines 20 and 22 to extract a selected power output therefrom is by way of setting the control lever 206 and thus governor 186 to request a maximum speed of turbine 30 and compressor 26 driven thereby to maximize available engine power and setting the power turbine control member 278 and thus power turbine governor 254 to establish a desired speed or power output of power turbine 34 by imposing a speed reset on governor 186 to reduce engine power in accordance with the power output demand imposed on power turbine 34.

It will be assumed that the engines 20 and 22 are stable in operation at a selected speed or power corresponding to the set position of control member 278 which through power turbine governor 254 and reset mechanism 226 imposes a reduction in the maximum speed request input to governor 186 established by the control lever 206 which occupies a maximum speed request position. The output torques of power turbines 34 of engines 20 and 22 will be assumed to be equal. Under such conditions, the various component elements of the fuel controls 46 and 48 as well as the torque comparing and limiting mechanism 72 will occupy the positions shown in FIGS. 1 and 2.

Now, it will be assumed that the control members 278 are actuated to position requesting a greater than existing speed of associated power output turbines 34. In response to movement of control member 278, the tension spring 274 is stretched thereby imposing a greater force on lever 264 which pivots counterclockwise against the lesser force imposed thereagainst by centrifugal weights 258 which movement of lever 264 causes flapper portion 270 to seat against orifice 272 which, in turn, results in a rise in air pressure against the one side of diaphragm 228 of reset mechanism 226. The resulting decrease in air pressure differential across diaphragm 228 urges the same as well as rod 232 attached thereto to the left thereby eliminating the reset force imposed on lever 196 which together with lever 198 bearing thereagainst under the influence of spring 216 is pivoted counterclockwise against the opposing force of centrifugal weights 220 thereby blocking passages 190 and 192 which results in a maximum rise in air pressure in chambers 180 and 184. The pressure drop across governor bellows 172 drops to zero and metering valve 168 is actuated in an opening direction in response to the compressor discharge air pressure $P_c$ imposed on evacuated acceleration bellows 174 which initiates acceleration of the associated engine 20. As the engine accelerates, compressor discharge pressure $P_c$ increases accordingly causing further compression of bellows 174 to thereby generate an acceleration fuel flow which increases as a function of compressor discharge air pressure $P_c$.

It may be desirable to provide fuel enrichment at a predetermined engine speed during an acceleration thereof. To that end, the spring 216 is selected to be overcome at a predetermined force output of centrifugal weights 220 corresponding to a predetermined speed of compressor 26. Upon reaching the speed at which spring 216 is overcome by weights 220, the lever 198 pivots clockwise relative to lever 196 thereby venting passage 192 to atmospheric pressure $P_a$ which, in turn, causes a reduction in air pressure in chamber 184. The resulting pressure differential across bellows 172 causes compression thereof which, in turn, aids acceleration bellows 174 in actuating metering valve 168 in an opening direction thereby increasing fuel flow to the engine accordingly. As the output force of centrifugal weights 220 increases with increasing engine speed, the lever 198 moves into engagement with lever 196 whereupon the force of spring 202 overcomes the relatively smaller force exerted by centrifugal weights 220.

The power turbine 34 accelerates as a result of the increasing power generated by the increased mass air flow resulting from the accelerating compressor 26. As the power turbine 34 approaches the selected speed established by control member 278, the output force of centrifugal weights 258 will overcome the opposing force of spring 274 and cause lever 264 to pivot thereby moving flapper portion 270 away from orifice 272. The drop in air pressure upstream from orifice 272 and resulting increase in air pressure differential across diaphragm 228 urges diaphragm 228 to the right causing rod 232 to engage lever 196 and load the latter with a force which overcomes the opposing force of spring 202 allowing lever 196 to pivot clockwise and open passage 190 to atmospheric pressure $P_a$. The resulting drop in air pressure in chamber 180 causes governor bellows 172 to expand thereby urging metering valve 168 in a closing direction to decrease metered fuel flow to the engine. Upon reaching the selected speed of power turbine 34, the lever 196 is stabilized by a balance of forces thereon and metered fuel flow to the engine is stabilized accordingly with the compressor 26 assuming a speed consistent with the power requirements necessary to maintain the selected sped of power turbine 34.

Assuming the power turbines 34 of engine 20 and 22 to be stabilized at the selected higher speed with substantially equal torque outputs, the fluid pressures generated by torque sensing devices 112 and 118 are substantially equal and are transmitted to bellows 98 and 100 of the torque comparing and limiting mechanism 72. The equally pressurized bellows 98 and 100 hold lever 92 in the null position shown in which flapper position 96 is substantially midway between orifices 84 and 86 which orifices are selected with suitable flow areas to establish flow saturated conditions thereof. The force of spring 230 acting against diaphragm 228 is balanced by the force derived from the pressure differential established by the saturated orifices 84 and 86 and imposed across diaphragm 228.

The bellows 134 and 136 being vented interiorly to the fluid pressure generated by torque sensing devices 112 and 118, respectively, impose equal forces against arms 138 and 136, respectively, which arms define equal effective lever arm lengths through which the bellows forces act to impose a clockwise movement on lever 128. The spring 146 which is selected with an output force corresponding to a predetermined maximum allowable torque output of power turbines 34 of engines 20 and 22 acts through its associated lever arm in opposition to the relatively lower moment derived from bellows 134 and 136 thereby holding flapper 132 seated against orifice 124 and 126 to block passages 142 and 144.

It will be assumed that the power output of engine 22 increases causing a causing a corresponding increase in torque output of turbine 34 thereof relative to engine 22 in which case the fluid pressure signal derived from torque sensing device 118 increases accordingly. The resulting increase in pressurization of bellows 98 generates a force differential between bellows 98 and 100 which urges lever 92 in a clockwise direction off its null position causing flapper portion 96 to move toward orifice 84. The resulting decrease in area of orifice causes a corresponding increase in air pressure upstream therefrom whereas the increase in area of orifice 86 has no effect on the air pressure upstream therefrom by virtue of the saturated condition of orifice 86.

The increase in air pressure upstream from orifice 84 and corresponding decrease in air pressure differential across diaphragm 228 of reset mechanism 226 associated with fuel control 46 decreases the load exerted by rod 232 against lever 196 which moves counterclockwise to close passage 190 causing an increase in air pressure in chamber 180 which, in turn, causes bellows 172 to compress thereby driving metering valve 168 in an opening direction. The increased speed and thus power of engine 20 produced by the increase in metered fuel thereto is reflected by an increase in torque output of associated power turbine 34 and corresponding increase in the fluid pressure signal generated by torque sensing device 118 and transmitted to bellows 100. The bellows 100 force increases accordingly until very nearly equal to that of bellows 98 at which time the lever 92 is stabilized approximately at the heretofore mentioned null position. It will be recognized that the lever 92 cannot return to the identical null position it occupied prior to the torque error signal impressed thereon by the bellows 98 and 100 since the inherent droop characteristic of the system requires the existence of some force error between bellows 98 and 100 to hold lever 92 and thus flapper portion 96 sufficiently close to orifice 84 to maintain the necessary increase in air pressure upstream from orifice 84 which acts against diaphragm 228 to generate the necessary input reset force to governor mechanism 186.

Upon reaching the abovementioned substantially balanced condition between torque output of power turbine 34 of engine 20 and the torque output of turbine 34 of engine 22, the flow of metered fuel to engine 20 and thus speed of compressor 26 thereof becomes stabilized by a force balance between the output force of centrifugal weights 220 and opposing force derived from spring 202 as modified by the reset force imposed on lever 196 by the reset diaphragm 228.

If the abovedescribed output torque error occurred in a reverse sense, it will be understood that the lever 92 would be upset off its null position in a direction to close orifice 86 as a result of bellows 100 overcoming bellows 98. In such a case, the governor mechanism 186 of engine 20 is uneffected and the governor mechanism 186 of engine 22 is reset to increase the torque output of power turbine 34 thereof to substantially that of power turbine 34 of engine 20.

Now referring to the torque limiting bellows 134 and 136, it will be assumed that the control members 278 of both power turbines 34 are set at maximum power positions such that the combined torque output of power turbines 34 of engines 20 and 22 may exceed a predetermined maximum limit established by the setting of spring 146. The torque outputs of both power turbines may be equal in which case the corresponding fluid pressures generated by torque sensing devices 112 and 118 and applied to bellows 134 and 136, respectively, result in equal output forces of bellows 134 and 136 which are additive and oppose spring 146 to urge lever 128 and thus flapper 132 thereof away from orifices 124 and 126. The resulting control over the air pressure upstream from orifices 124 and 126 and thus air pressure differential across the respective diaphragms 228 imposes a corresponding reset force on each of the governor mechanisms 186 of fuel controls 46 and 48 in a manner similar to, but in a reverse sense, from that described heretofore with regard to the torque output error imposed on torque comparing bellows 98 and 100. The decrease in air pressures upstream from orifices 134 and 136 and imposed on the associated diaphragms 228 result in reset forces generated by diaphragms 228 which act upon levers 196 to decrease the effective force loading of associated springs 202 which, in turn, results in a repositioning of levers 196 away from passages 190 and a corresponding drop in air pressure in the respective chambers 180. The governor bellows 172 expand in response to the increased pressure differential thereacross and actuate the associated metering valve 168 in a closing direction to reduce metered fuel flow to the respective engines 20 and 22 thereby causing a decrease in the speeds of compressor 26 thereof and thus output torque of power turbines 34 associated therewith to the extent that the output forces of bellows 134 and 136 in response to the air pressures generated by torque sensing devices 112 and 118, respectively, and spring 146 become balanced whereupon the engines 20 and 22 are stabilized accordingly.

It will be noted that the maximum limiting torque may be maintained even under a condition of power deterioration in one of the engines 20 and 22. Assuming the engine 20 to malfunction causing a corresponding drop in torque output of power turbine 34 thereof, the fluid pressure signal generated by torque sensing device 118 will decrease accordingly. The response of bellows 100 and resulting force unbalance on lever 92 will be in a direction to increase the air pressure upstream from orifice 84 in an attempt to reset governor mechanism 186 of fuel control 46 and increase the power output thereof in an attempt to raise the torque output of turbine 34 of engine 20 to the higher torque output of turbine 34 of engine 22. However, the engine 20 may be unable to respond to the increased flow of metered fuel thereto to the extent that a balance of forces between bellows 98 and 100 can be attained. In such a case, the sum of the force outputs of bellows 134 and 136 will decrease in response to the decreased fluid pressure generated by torque sensing device 118. The spring 146 overcomes bellows 134 and 136 thereby displacing lever 128 causing flapper 132 to move toward orifices 124 and 126 thereby increasing the air pressure upstream therefrom simultaneously which, in turn, decreases the air pressure differential across the diaphragm 228 of both governor mechanisms 186 simultaneously. As in the case of bellows 98 and 100 the reset force imposed on governor mechanism 186 and subsequent increase in metered fuel to the malfunctioning engine 20 is ineffective in raising the torque output of power turbine 34 thereof. However, the reset force imposed on governor mechanism 186 of engine 22 and subsequent increase in metered fuel effects an increase in speed of compressor 26 and thus power of engine 22 in response to which the output torque of power turbine 34 thereof increases accordingly. As the fluid pressure signal generated by torque sensing device 112 increases in response to increasing torque output of associated power turbine 34, the bellows 134 force increases accordingly and, in combination with the lesser force output of bellows 136, balances the spring 146 force thereby stabilizing lever 128 and regulating the air pressure upstream from orifices 124 and 126 to maintain the necessary reset force input to governor mechanism 186 of engine 22. It will be recognized that the additional power demand imposed on engine 22 to maintain the total torque output of power turbines 34 at the maximum would be on a temporary basis such as emergency operation whereby the engine 22 may be expected to deliver the required added torque output for a limited period of time with reasonable reliability.

It will be noted that the torque comparing and limiting mechanism 72 is not effective to reset either governor 186 during engine accelerations since any increase in air pressures upstream from orifices 84 and 86 reduces the pressure differential across diaphragm 228 which, in turn, holds rod out of engagement with lever 196.

Various modifications and changes in the above described preferred embodiment may be made without departing from the scope of applicant's invention as defined by the following claims.

I claim:

1. Control apparatus for coordinating the relative power output of at least two combustion engines connected to drive power absorbing apparatus and provided with independently operative fuel control apparatus including governor mechanism responsive to the position of a control lever and speed of the engine associated therewith, said control apparatus comprising:
   first means operatively connected to one of the two engines and adapted to produce a first output signal as a function of power output thereof;
   second means operatively connected to the other of the two engines and adapted to produce a second output signal as a function of power output thereof;
   first governor reset means operatively connected to the governor mechanism of one of the two engines;
   second governor reset means operatively connected to the governor mechanism of the other of the two engines;
   first control means responsive to said first and second output signals and operatively connected to the governor reset mechanism of each engine for resetting the governor mechanism of one engine to increase the power output thereof to substantially equalize the power output of both engines; and
   second control means responsive to said first and second output signals and a reference signal representing a maximum permissible total power output of both of said engines and operatively connected to the governor mechanism of each engine for resetting the same to increase the power output of at least one engine to compensate for a loss in power output of the other engine to maintain a balance between said reference signal and the sum of said first and second output signals.

2. Control apparatus as claimed in claim 1 wherein:
   said first and second output signals are fluid pressures; and
   said first control means includes fluid pressure responsive means exposed to said fluid pressures corresponding to said first and second output signals and responsive to the pressure differential therebetween.

3. Control apparatus as claimed in claim 2 wherein:
   said first and second governor reset means each include a fluid pressure responsive member responsive to first and second control fluid pressures, respectively, for generating corresponding governor reset forces;
   said first control means further includes valve means operatively connected to said fluid pressure responsive means and actuated thereby and connected to control said first and second control fluid pressures.

4. Control apparatus as claimed in claim 3 wherein:
   said second control means includes second and third fluid pressure responsive means exposed to said fluid pressures corresponding to said first and second output signals, respectively, for generating a force which varies as the sum of said first and second output signals;
   said reference signal being generated by force producing means acting in opposition to said first named force; and
   secont valve means operatively connected to and actuated by said second and third fluid pressure responsive means and said force producing means;
   said valve means being operatively connected to control said first and second control fluid pressures independently of said first control means.

5. Control apparatus as claimed in claim 1 wherein:
   said first and second governor reset means each include a fluid pressure responsive member exposed to a substantially constant fluid pressure and a variable fluid pressure and responsive to the pressure differential therebetween;
   said first control means includes valve means connected to control one of said variable fluid pressures independently of the other; and
   means responsive to said first and second output signals operatively connected to said valve means for actuating the same in response to an error between said first and second output signals.

6. Control apparatus as claimed in claim 1 wherein said combustion engines are of the gas turbine type having independently rotating gas producer and free turbines controlled by separate speed control governors and wherein:
   said first and second output signals are fluid pressures which vary in accordance with the free turbine output torque of the respective engines;
   said first and second governor reset means are operatively connected to the gas producer speed control governor of an engine associated therewith and adapted to reset the same to increase the speed of the gas producer turbine and thus torque output of the free turbine associated therewith.

7. Control apparatus as claimed in claim 1 wherein:
   said first and second governor reset means each include a fluid pressure responsive member responsive to first of second controlled fluid pressures, respectively, for generating corresponding governor reset forces;
   said first and second output signals are fluid pressures;
   said first control means includes first and second bellows responsive to the fluid pressure corresponding to said first and second output signals, respectively;
   first and second flow orifices connected to vent said first and second controlled fluid pressures to a relatively low pressure fluid source;

flapper means operatively connected to said first and second orifices and said first and second bellows for varying the effective flow area of said first and second orifices in response to pressurization of said first and second bellows;

said flapper means occupying a null position relative to said first and second orifices in response to substantially equal and opposite forces generated by said first and second bellows whereby said first and second orifices are maintained in a flow saturated condition;

said flapper means being actuated from said null position in response to a force differential between said first and second bellows to decrease the effective flow area of one of said first and second orifices depending upon the predominating force to cause a corresponding increase in said one of said first and second fluid pressures without affecting the other.

8. Control apparatus as claimed in claim 7 wherein:
said second control means includes third and fourth bellows responsive to said first and second output signals, respectively;
third and fourth flow orifices connected in parallel flow relationship with said first and second orifices, respectively;
second flapper means operatively connected to said third and fourth orifices and said third and fourth bellows for varying the effective flow area of said third and fourth orifices in response to pressurization of said third and fourth bellows;
resilient reference force producing means operatively connected to said second flapper means in force opposing relationship to said third and fourth bellows;
said flapper means being actuated in response to said third and fourth bellows overcoming said reference force producing means to simultaneously increase the effective flow area of said third and fourth orifices and cause a corresponding decrease in said first and second fluid pressures.

9. Control apparatus as claimed in claim 5 wherein said combustion engines are of the gas turbine type having an air compressor, a gas turbine for rotating the compressor and an independently rotating free turbine and wherein:
said substantially constant fluid pressure and said variable fluid pressures are derived from pressurized air discharged by said air compressor.

10. Control apparatus as claimed in claim 7 wherein:
said first and second controlled fluid pressures are derived from a pressurized air source; and
said relatively low pressure fluid source is the atmosphere.

References Cited

UNITED STATES PATENTS

| | | | |
|---|---|---|---|
| 2,942,416 | 6/1960 | Buckingham | 60—39.15 |
| 3,022,628 | 2/1962 | Prentiss | 60—224 X |
| 3,159,000 | 12/1964 | McCombs | 60—102 X |
| 3,174,284 | 3/1965 | McCarthy | 60—39.16 |
| 3,200,886 | 8/1965 | Magri et al. | 60—39.28 X |
| 3,307,351 | 3/1967 | Wheeler et al. | |
| 3,309,868 | 3/1967 | Downing et al. | 60—39.16 |
| 3,365,882 | 1/1968 | Greune | 60—224 X |
| 3,368,346 | 2/1968 | Warne | 60—97 X |
| 3,403,507 | 10/1968 | Schuster | 60—39.15 |
| 3,438,199 | 4/1969 | McGinnis et al. | 60—39.28 |

AL LAWRENCE SMITH, Primary Examiner

U.S. Cl. X.R.

60—39.28, 102, 224